(No Model.)

C. H. HERSEY.
DRIER.

No. 245,951. Patented Aug. 23, 1881.

Witnesses.
John F. P. ?
W. H. Sigston.

Inventor.
Charles H. Hersey
by Crosby Gregory
Attys.

UNITED STATES PATENT OFFICE.

CHARLES H. HERSEY, OF BOSTON, MASSACHUSETTS.

DRIER.

SPECIFICATION forming part of Letters Patent No. 245,951, dated August 23, 1881.

Application filed June 16, 1881. (No model.)

*To all whom it may concern:*

Be it known that I, CHARLES H. HERSEY, of Boston, county of Suffolk, State of Massachusetts, have invented an Improvement in Driers, of which the following description, in connection with the accompanying drawings, is a specification.

This invention relates to drying apparatus for sugar, grain, or similar material, and is intended as an improvement on Letters Patent No. 114,137, granted to me April 25, 1871, to which reference may be had. In the said patent an apparatus was shown consisting, essentially, of a hollow drum having a smaller heating-cylinder within it, the said cylinder being fixed within the said drum, and they together were slowly rotated by suitable actuating mechanism. The outer drum was provided with a series of blades or buckets, which, in its rotation, raised the material to be dried until the said buckets arrived above the heating-cylinder, when the material was dropped or showered down therefrom, and thoroughly subjected to the heat from the said cylinder. A current of air is passed through the said drum, and becoming heated in its passage assists in drying the granular material falling through it. By locating the heating-cylinder centrally in the drum a considerable space vertically below and between it and the drum is not utilized for drying, and the current of air passes freely through the space without acting upon the granular material which falls from the surface of the said heating-cylinder at either side of, but not through, the said space.

My present invention has for its object to utilize, as nearly as possible, the entire space within the drum for heating and drying the granular material; and it consists in placing the said heating-cylinder as near as possible to the under side of the said drum, the said drum and cylinder being mounted upon independent bearings and rotated independently of one another, but, as herein shown, actuated by the same counter-shaft. The drum is provided with a series of tappets or large inclined teeth, upon which rests one end of a striking bar or block, pivoted at its other end, the said bar being raised by the said tappets as they pass beneath it in the rotary movement of the drum, and then permitted to fall upon the surface of the said drum to agitate or jar it and detach the granular material which might otherwise adhere to it.

Figure 1:
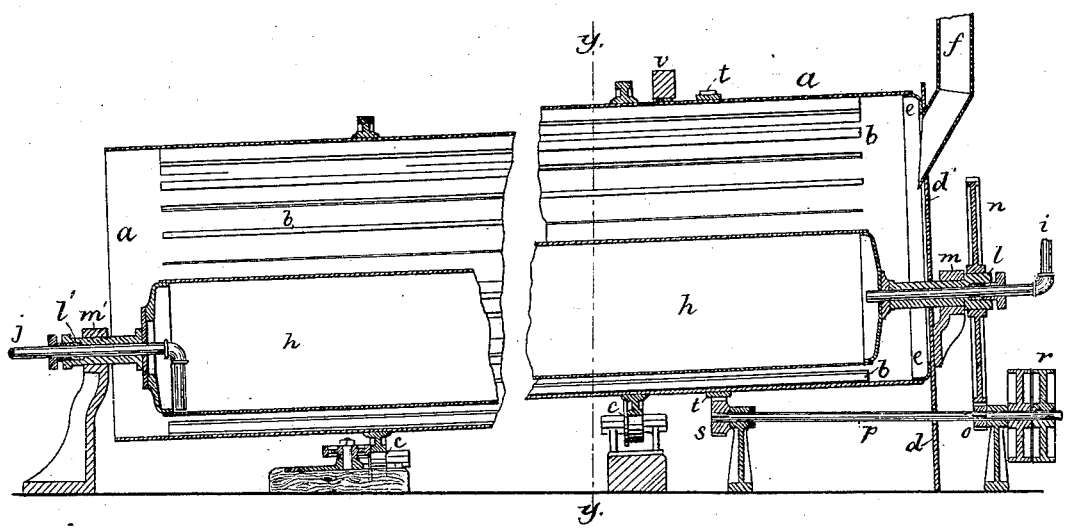
Figure 2:
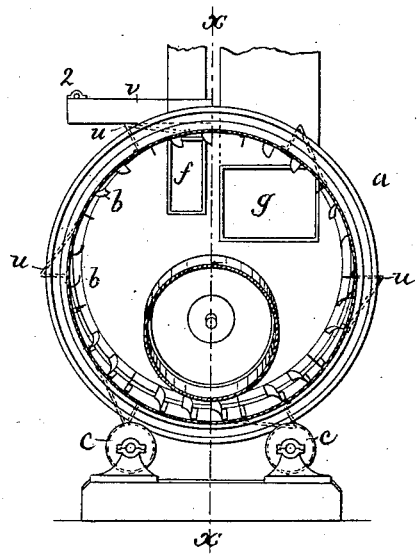

Figure 1 shows in longitudinal section on line $x\,x$, Fig. 2, a drying apparatus embodying my invention; and Fig. 2, a transverse section thereof on line $y\,y$, Fig. 1.

The outer drum, $a$, provided with blades or buckets $b$ along its interior, is mounted upon friction-rolls $c$, with its axis slightly inclined from a horizontal position, substantially as in the former patent referred to. At the higher end of the said drum is a fixed plate or partition, $d$, provided with a flange, $e$, that fits within and closes the end of the said drum, the other end of which is open. A chute or conducting-pipe, $f$, passing through the said partition $d$, serves to introduce the material to be dried to the said drum $a$, and a draft-tube, $g$, (see Fig. 2,) also opening into the said partition, is provided with suitable blowing apparatus to cause a current of air to enter the open end of the drum $a$ and pass therethrough in the opposite direction to the material being dried, which, owing to the inclination of the said drum, gradually passes downward toward and out of the open end thereof.

The interior or heating cylinder, $h$, provided with inlet and outlet pipes $i\,j$, is shown substantially the same as in the former patent referred to, but is provided with journals $l\,l'$, mounted in bearings $m\,m'$, independent of the drum $a$, and situated below the axis thereof, in such position as to bring the said heating-cylinder as low down in the drum $a$ as possible without interfering with the movements of the said drum. By thus locating the drying-cylinder $h$ in the lower part of the drum $a$ the granular material falling from the buckets $b$ passes through a much larger space (nearly the whole interior of the said drum) than when the said cylinder is centrally located thereon, and the said material is brought in contact with nearly every portion of the column of heated air passing through the said drum.

The arbor $l$ of the heating-cylinder $h$ is provided with a driving-gear, $n$, meshing with a pinion, $o$, on the shaft $p$, driven in any suitable manner, as by the pulley $r$, and provided with another pinion, $s$, meshing with a gear, $t$, encircling the drum $a$, so that the rotation of the shaft $p$ produces rotation in both the cylinder $h$ and drum $a$; but the velocity and direction of movement of the said drum and cylinder may be the same or different, as is found desirable for different substances in connection with which the apparatus may be used.

The drum $a$ is provided with a series of tappets or large inclined teeth, $u$, lying in the path of a striking-block, $v$, pivoted at 2, so that as the said tappets pass beneath the said block in the rotation of the drum $a$ they raise it and then permit it to drop upon the surface of the said drum to jar it and detach the material which might otherwise adhere to its inner surface.

It is obvious that the heating-cylinder may be constructed as in my Patent No. 149,397, dated April 7, 1874, without departing from my present invention; or, that by lengthening the arbor or shaft $l$ of the said cylinder, the apparatus may be made to dry and afterward cool the material, as shown and described in my Patent No. 189,625, dated April 17, 1877.

I claim—

1. The drying apparatus consisting of a drum provided with buckets, and an interior heating-cylinder mounted upon independent bearings below the axis of the said drum, and means to rotate the said drum and cylinder, substantially as and for the purpose described.

2. The drum mounted in an inclined position, and the partition closing the end thereof, and provided with a feeding-chute and draft-tube, combined with the heating-cylinder mounted upon independent bearings eccentrically in the lower portion of the said drum, and actuating mechanism to rotate the said drum and cylinder, substantially as and for the purpose described.

3. The drum provided with a series of tappets and the heating-cylinder therein, combined with actuating mechanism to rotate the said drum and cylinder, and the striking-block actuated by the said tappets to strike blows upon the surface of the said drum, substantially as and for the purpose described.

In testimony whereof I have signed my name to this specification in the presence of two subscribing witnesses.

CHAS. H. HERSEY.

Witnesses:
 JOS. P. LIVERMORE,
 B. J. NOYES.